No. 787,097. Patented April 11, 1905.

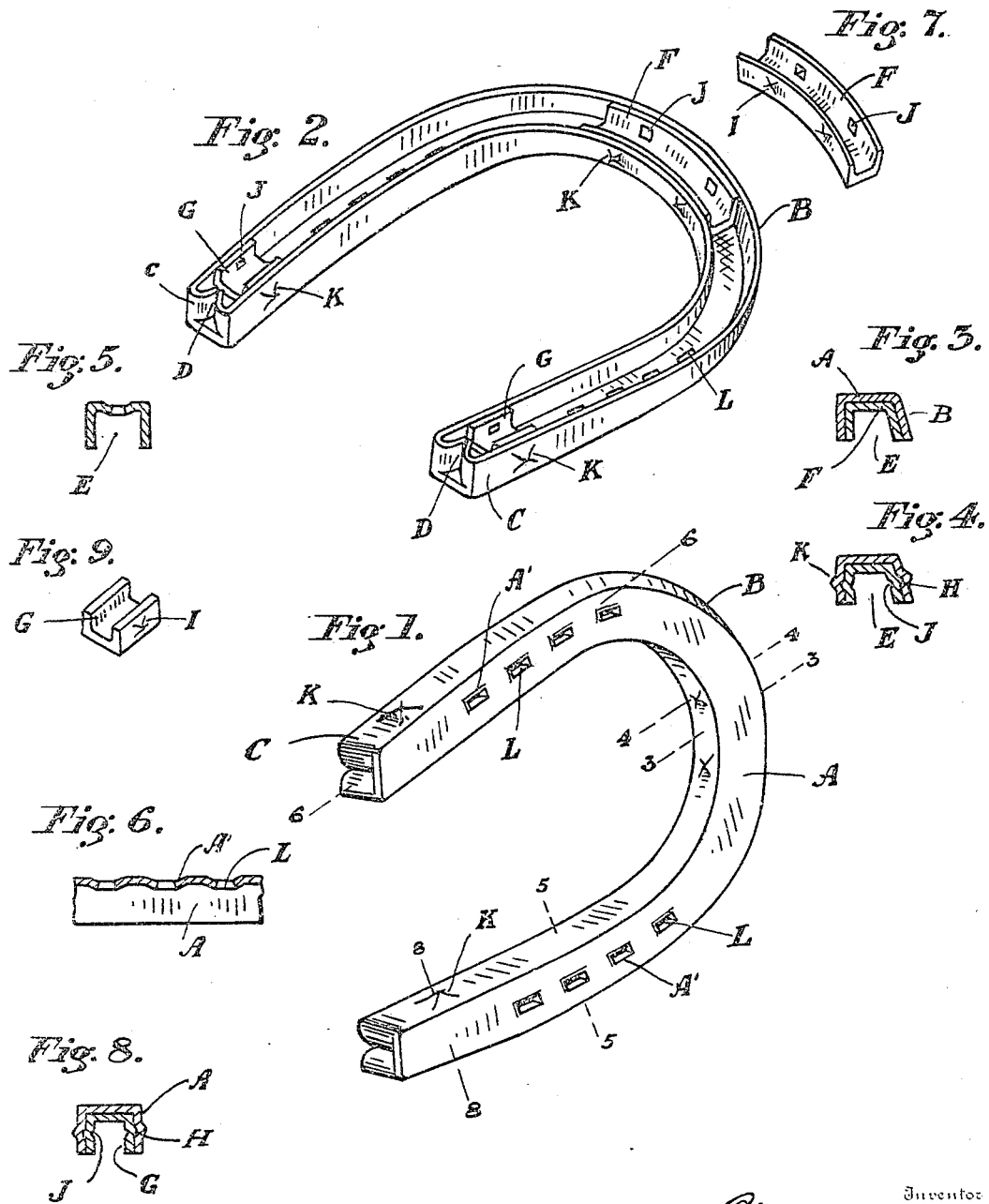

UNITED STATES PATENT OFFICE.

CHARLES HEART, OF ALEXANDRIA, INDIANA, ASSIGNOR TO HEART METAL WHEEL & GEAR COMPANY, OF ALEXANDRIA, INDIANA, A CORPORATION.

METAL HORSESHOE.

SPECIFICATION forming part of Letters Patent No. 787,097, dated April 11, 1905.

Application filed December 3, 1904. Serial No. 235,281.

*To all whom it may concern:*

Be it known that I, CHARLES HEART, a citizen of the United States, and a resident of Alexandria, in the county of Madison and State of Indiana, have invented Improvements in Metal Horseshoes, of which the following is a specification.

My invention relates to improvements in horseshoes.

The objects and purposes of my improvements are to construct a horseshoe of metal which will be light, simply and ecomically made, and at the same time strong enough to withstand the wear and tear of ordinary usage, and in which the weight of the same may be varied without necessarily varying the general dimensions of the same.

Another object is to construct a horseshoe which will take hold of quickly and hold tenaciously throughout the surface of its tread to the surface traveled.

These and other objects not hereinbefore mentioned are accomplished by the construction illustrated in the accompanying drawings, wherein similar letters of reference indicate corresponding parts in the several views, in which—

Figure 1 is a perspective top view of my improved horseshoe. Fig. 2 is a view of the same inverted. Fig. 3 is a vertical cross-section on the line 3 3, Fig. 1. Fig. 4 is a vertical cross-section on the line 4 4, Fig. 1. Fig. 5 is a vertical cross-section on the line 5 5, Fig. 1. Fig. 6 is a detached longitudinal view on the line 6 6, Fig. 1, with part of the horseshoe broken away. Fig. 7 is a detached view of the toe-block. Fig. 8 is a vertical cross-section on the line 8 8, Fig. 1; and Fig. 9 is a detached view of the heel-block.

In the drawings, A designates the body of my improved horseshoe, made of sheet metal of suitable thickness, continuous throughout its extent, substantially U-shaped in cross-section, and having its walls extending downwardly substantially at right angles to the upper surface of the horseshoe. As plainly shown in Figs. 2 and 3, the lower portion of the frontal wall B is slightly flared, imparting rigidity and a finished appearance.

The rear ends C of the horseshoe are formed by the walls of the same being bent laterally inwardly, the ends D of each resting continuously and firmly in contact each with the other, as plainly shown in Figs. 1 and 2, thus forming a rounding and smooth exterior finish and bracing and stiffening the walls and top of the shoe.

In the construction described the continuous channel E is formed and so adapted that the toe-block F and the heel-blocks G may be inserted and secured therein when it is desired to impart additional rigidity to the same; also, the channel is adapted to receive filling of rubber or composition, if the use of the same is desired. It will also be observed that the horseshoe throughout its extent underneath is open, and the free edges of the walls are adapted to take hold quickly and to hold tenaciously throughout their extent to the surface upon which the horse wearing the shoes is traveling, thus dispensing with the bulk and extraneous weight necessary and the calks now used in the construction of the ordinary and well-known style of horseshoes, which calks are under ordinary usage rapidly worn away, rendering the shoe smooth throughout the extent of its tread and unsafe and inefficient except where used upon certain surfaces.

A further advantage obtained by my improvements is that in the use of my improved horseshoe by reason of the same wearing away uniformly throughout the extent of its tread the hoof of the horse wearing the same retains its normal poise as long as the shoe may be worn. Further, so long as my improved horseshoe may be worn its efficiency to hold or cling to the surface traveled upon is not impaired, as is obviously the case in the use of the ordinary and well-known style of horseshoe.

When it is desired that the horseshoe to be constructed shall have more than the ordinary rigidity, I secure within the channel E, at the rear ends C, the heel-blocks G and within the frontal portion of the channel the toe-block F. These blocks are channel-shaped in cross-section, as plainly shown in Figs. 3, 4, and 8. I prefer the use of these blocks so shaped, but do not desire to limit myself, as it is obvious they may be made in varying shapes.

H designates apertures provided in the inner surfaces of the walls at the front and rear portions of the same. These apertures are formed by indentation when the body of the horseshoe is formed and are adapted to receive the blunt-pointed lugs I, similarly formed in the toe-blocks F and the heel-blocks G, which blocks are forced into position at their proper places in the channel E. The walls of the horseshoe are thus sprung and the blunt-pointed lugs I fit and are retained snugly and firmly within the apertures H, thus securing rigidly in permanent position the said blocks.

J designates the apertures incidental to the formation by indentation of the lugs I, and K designates the raised portions incidental to like formation of the apertures H.

L designates the holes through which the nails for securing the shoes to the horse are inserted and are formed by being punched simultaneously with the forming of the shoe. In the formation of these holes the portion A' of the shoe immediately adjacent to the hole is slightly depressed, as plainly shown in Figs. 5 and 6, thus increasing the lateral area of the holes, so that when the same by a second operation are formed wedge-shaped with maximum width underneath suitable bearing-surface for the sides of the nail-heads will be obtained.

In the drawings I have shown my improved horseshoe symmetrical in general form. It is obvious that the same may be varied in general shape as may be desired. I am aware that many minor changes can be made in the construction and arrangements of the parts without in the least departing from the nature and principles of my invention.

Having thus described my invention, what I claim as new, and desire to secure by Letters Patent, is—

1. In a horseshoe of the kind described comprising continuous U-shaped body with substantially vertically downwardly extending walls, continuous open channel between the said walls, said walls of each leg of the shoe being severed and each curled laterally inwardly and toward and adapted to rest in continuous and uniform contact at their ends, each with the other.

2. In a horseshoe of the kind described comprising continuous U-shaped body with substantially vertically downwardly extending walls, continuous open channel between the said walls, indentations in said walls; toe-block and heel-blocks with projections adapted to fit within the said indentations.

3. In a horseshoe of the kind described comprising continuous U-shaped body with substantially vertically downwardly extending walls, continuous open channel between the said walls, said walls of each leg of the shoe being severed and each curled laterally inwardly and toward each other and adapted to rest in continuous and uniform contact at their ends, each with the other; indentations in the said walls; toe-block and heel-blocks with projections adapted to fit within the said indentations; vertically-extending wedge-shaped openings in said body and depressions in said body at each of said openings.

In testimony whereof I have hereunto set my hand in the presence of two witnesses.

CHARLES HEART.

Witnesses:
J. J. PURCELL,
A. BISHOP.